United States Patent
Bhowmik et al.

(10) Patent No.: US 11,603,503 B2
(45) Date of Patent: Mar. 14, 2023

(54) ADDITIVE COMPOSITION AS A COMBUSTION IMPROVER FOR LIQUID AND GASEOUS FUELS

(71) Applicant: INDIAN OIL CORPORATION LIMITED, Maharashtra (IN)

(72) Inventors: Koushik Bhowmik, Faridabad (IN); Mukesh Kumar Vyas, Faridabad (IN); Jyoti Ota, Faridabad (IN); Samik Kumar Hait, Faridabad (IN); Vivekanand Kagdiyal, Faridabad (IN); Deepak Saxena, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 17/748,196

(22) Filed: May 19, 2022

(65) Prior Publication Data
US 2022/0372386 A1    Nov. 24, 2022

(30) Foreign Application Priority Data
May 20, 2021  (IN) .............................. 202121022567

(51) Int. Cl.
*C10L 1/30* (2006.01)
*C10L 1/12* (2006.01)

(52) U.S. Cl.
CPC ............ *C10L 1/301* (2013.01); *C10L 1/1216* (2013.01); *C10L 2200/024* (2013.01);
(Continued)

(58) Field of Classification Search
CPC .................. C10L 1/301; C10L 1/1216; C10L 2200/024; C10L 2200/0245; C10L 2200/029; C10L 2230/22; C10L 2270/026
See application file for complete search history.

(56) References Cited

U.S. PATENT DOCUMENTS

| 4,857,499 A | 8/1989 | Ito et al. |
| 8,182,555 B2 * | 5/2012 | Tock ...................... F02B 43/02 |
| | | 44/457 |

(Continued)

FOREIGN PATENT DOCUMENTS

| WO | 2004065529 A1 | 8/2004 |
| WO | 2010071641 A1 | 6/2010 |
| WO | WO-2019016391 A1 * | 1/2019 ............ B01J 35/023 |

OTHER PUBLICATIONS

Gu et al., "Preparation and Characterization of Monodisperse Cerium Oxide Nanoparticles in Hydrocarbon Solvents" Chemistry of Materials, Feb. 13, 2007, 19, 5, 1103-1110.

(Continued)

*Primary Examiner* — Pamela H Weiss
(74) *Attorney, Agent, or Firm* — Maschoff Brennan

(57) ABSTRACT

This invention is related to an additive composition comprising metal-based quantum clusters (QCs) dispersed in a hydrocarbon medium. The additive composition is useful as a fuel additive, as it acts as a combustion improver for liquid and gaseous fuels. The invention describes a process for the synthesis of the additive composition comprising metal-based materials in atomic cluster form in hydrocarbon dispersible medium. The stable liquid dispersion of the QC has been doped into the hydrocarbon fuels at required concentrations. The measurable flame temperature of the fuels, e.g., commercial LPG on burner has been observed to increase by at least 60-80° C. The flame with high heat through put can be used for efficient cooking, heating, annealing and other high thermal applications. The additive composition may also be used to improve the fuel economy of the liquid hydrocarbon fuels.

13 Claims, 5 Drawing Sheets

(52) U.S. Cl.
CPC .................. *C10L 2200/029* (2013.01); *C10L 2200/0245* (2013.01); *C10L 2230/22* (2013.01); *C10L 2270/026* (2013.01)

(56) References Cited

U.S. PATENT DOCUMENTS

| | | |
|---|---|---|
| 2011/0007787 A1 | 1/2011 | Suga et al. |
| 2014/0203213 A1* | 7/2014 | Thalappil .................. C30B 7/00 252/301.36 |
| 2019/0308884 A1* | 10/2019 | Christou ............... C01F 17/235 |
| 2020/0216762 A1 | 7/2020 | Lopez Quintela et al. |

OTHER PUBLICATIONS

Kim et al., "Continuous Synthesis of Surface-Modified Metal Oxide Nanoparticles Using Supercritical Methanol for Highly Stabilized Nanofluids", Chemistry of Materials, 20(20), 6301-6303, Sep. 2008.

Kumar et al., "Scoot combustion improvement in diesel particulate filters catalyzed with ceria nanofibers" Chemical Engineering Journal, 207-208258-266, Oct. 2012.

Tok et al., "Hydrothermal synthesis of $CeO_2$ nano-particles" Journal of Materials Processing Tech., 2007, 190, 1-3, 217-222, Jul. 23, 2007.

Sajith et al., "Experimental Investigations on the Effects of Cerium Oxide Nanoparticle Fuel Additives on Biodiesel" Hindawi Publishing Corporation, Advances in Mechanical Engineering, vol. 2010, Article ID 581497, 6 pages, Oct. 6, 2009.

Tai et al., "Synthesis of submicron barium carbonate using a high-gravity technique" Chem. Eng. Sci. 61 (2006) 7479-7486, Sep. 14, 2006.

* cited by examiner

ADDITIVE COMPOSITION AS A COMBUSTION IMPROVER FOR LIQUID AND GASEOUS FUELS

FIELD OF THE INVENTION

The present invention relates to an additive composition comprising metal-based quantum clusters (QCs) in atomic cluster form dispersed in a hydrocarbon medium. It also relates to a process for synthesis of the additive composition. The additive composition is useful as a fuel additive. It acts as a combustion improver for gaseous and liquid fuels.

BACKGROUND OF THE INVENTION

Many efforts have been given to increase the combustion efficiency of the fossil fuels available in various forms, may it be gaseous or liquid. There are many approaches to increase fuel economy by formulating new engine oil or fuel additive. Complete combustion in IC engines and maximum heat through put from a fuel is in demand to meet the required combustion efficiency. For this same purpose, cerium oxide and doped cerium oxides are being used because of enhanced oxygen storage properties.

Liquefied petroleum gas (LPG) has been traditionally used as the fuel for auto industry, domestic and commercial cooking. However, the domestic as well as auto/commercial/industrial LPG market is facing stiff competition from peer companies and rising compressed natural gas (CNG)/piped natural gas (PNG) market. In this regard, increasing the heat output/efficiency of the LPG would be beneficial in terms of less fuel consumption and that would retain as well as attract more customers.

In recent years, cerium oxide has attracted considerable attention in various applications. Making the use of ceria as combustion improver for hydrocarbon fuels would increase the efficiency. However, dispersion of these combustion improver in the fuel matrix is a challenge. Another challenge is to inhibit the surface charge of active catalyst to avoid agglomeration during synthesis.

US patent application 20110007787A1 discloses that nano sized $CeO_2$ based materials have some exclusive properties, for example, cerium (IV) oxide $CeO_2$ nanoparticles have been added as an additive to diesel acting as a three-way catalyst (TWC) in the reduction of toxic auto exhaust gases and to increase fuel economy.

P. A. Kumar et al. discloses that the presence of the $CeO_2$ in the diesel fuel helps to burn off the particulates from combustion of diesel so that the diesel particulate filters (DPF) in the vehicle can be regenerated at a low temperature and work much longer time [*Chem. Eng.* 2012, 207, 258-266]. By adding surface modified $CeO_2$ nanoparticles to the fuel, it helps to improve the efficiency of a fuel.

V. Sajith et al. discloses that the flash point, and the viscosity of biodiesel were found to increase with the inclusion of the $CeO_2$ nanoparticles [*Adv. Mech. Eng.* 2010, (2010) 47-52].

U.S. Pat. No. 8,182,555B2 discloses that the emission levels of hydrocarbon and nitric oxides (NOx) are appreciably reduced with the addition of $CeO_2$ nanoparticles. Not only ceria but also nano-sized zinc oxide present in the liquid fuel provides a catalytic surface capable of supplying oxygen to the combustion process.

US patent application 4857499A postulates that the effect of iron and other transition metal oxide can be a very promising high temperature combustion catalyst.

WO publication 2010071641A1 relates to cerium dioxide nanoparticles, $Ce_{1-x}M_xO_2$, containing one or more transition metals, and a method for preparing the nanoparticle. The nanoparticles are used as components of fuel additive compositions, as a wash coat for catalytic converters, or as a catalyst for a reduction/oxidation reaction. It discloses particle size of 1 nanometer (nm) to 10 nm.

US patent application 20200216762A1 relates to a process for oxidation of organosulfur compounds comprising metal atomic (QCs) having between 5 and 13 metal atoms as catalyst. It further discloses metal atomic (QCs) is supported on material, prepared by dropping the corresponding atomic (QCs) solution onto the support and left drying.

WO publication 2004065529A1 relates to a method of improving the efficiency of a fuel by adding additives to the fuel prior to the introduction of the fuel to a vehicle. It further discloses cerium oxide is doped with a divalent or trivalent metal or metalloid which is a rare earth metal, a transition metal, or a metal of group IIA, VB or VIB. D3 also relates to size of cerium oxide and/or doped cerium oxide 1 to 300 nm.

For the above-mentioned applications, the cerium oxide particles should be small enough and remain in a stable dispersion in the organic phase. However, nanoparticles with a primary particle size <5 nm have a stronger propensity to agglomerate.

Tok et al. adopted low temperature hydrothermal synthesis process to synthesize nano crystalline $CeO_2$ [*J. Mater. Process. Technol.* 190 (2007) 217-222]. But after the heat treatment, particles were found agglomerated. The benefits expected from the nano sized $CeO_2$ particles are easily lost if the synthetic route and component cannot protect the synthesized particles from agglomeration. Djuric and Pickering added hydrogen peroxide to cerium nitrate at 5° C. to slowly oxidize $Ce^{3+}$ to $Ce^{4+}$ and thereby initiated homogeneous precipitation with the formation of dense spherical agglomerates. The precipitation process was completed by the addition of ammonium hydroxide which disrupted the spherical agglomerates leaving a weakly agglomerated powder of hydrated Ceria. This method has certain direction to stabilize the Ceria nanoparticles without agglomeration. But it is still difficult to disperse the $CeO_2$ nanoparticles in organic nonpolar solvent.

To make agglomeration free and stable $CeO_2$ nanoparticles, the surface-modified method becomes more popular. Kim et al. prepared surface-modified Ceria ($CeO_2$) nanoparticles by introducing a solution of ceria (III) nitrate (Ce $(NO_3)_3$) and decanoic acid (as a surface modifier) in methanol to a continuous flow reactor system [*Chem. Mater.* 20 (2008) 6301-6303]. The nanoparticles formed stable dispersion in ethylene glycol. Gu and Soucek presented a method to produce stable mono-dispersed cerium oxide nanoparticles in hydrocarbon solvents using oleic acid as surfactant [*Chem. Mater.* 19 (2007) 1103-1110]. A cerium-oleate complex was decomposed in the solvent with high boiling point to form cerium oxides nanoparticles. Wei et al. have developed a new process, the Higee technology [*Chem. Eng. Sci.* 61 (2006) 7479-7486], for in-situ synthesizing oil-soluble surface-modified $CeO_2$ nanoparticles on a large scale at room temperature. The product can be easily dispersed in diesel and lubricating oil. The mass percentage of $CeO_2$ is about 12%. The particles are uniform nanosized and have the fluorite structure. The smallest size distribution is 5 to 15 nm when the rotation speed 2500 rpm.

Use of these nanoparticles as combustion catalyst for fuels require the nanoparticles to be well dispersed in oil. Previously as these particles could be easily synthesized in aqueous medium, they were known to be re-dispersed in oil by solvent shifting technique using some stabilizer. However, most of the particle stabilizers used in aqueous phase are not suitable in non-polar medium. Mostly when placed in non-polar medium the particles get immediately agglomerated, settled out and lose some desirable properties. Therefore, it is still a challenge to obtain high concentrated and stabilized homogeneous nano-metal oxide dispersions especially in the oil phase. Therefore, the inventors of the present invention have disclosed that bottom-up synthesis approach of the metal oxide can be adopted in presence of a suitable dispersant to make a stable in-situ dispersion of the same in a hydrocarbon compatible medium, to act as an additive composition for increasing the combustion of liquid and gaseous fuels. Nano dispersion of the metal oxide in a matrix compatible to the fuels would thus serve the purpose.

SUMMARY OF THE PRESENT INVENTION

The present invention discloses surface modified metal-based QCs in size below 1 nm, without any agglomeration. These QCs have been synthesized in-situ in a hydrocarbon dispersible medium. The metal-based QC in atomic cluster form were found stable enough and compatible with the hydrocarbon-based fuels. Therefore, an additive composition comprising metal-based QC in a hydrocarbon medium act as a combustion improver for fuels. Both ceria and iron-based QCs are being used to improve the flame temperature of gaseous fuels. The fuel gas doped with the additive composition have been found to have better flame temperature compared to that of the neat fuel. Liquid fuel doped with the ceria cluster at requisite doping shows better combustion efficiency and fuel economy.

These ceria and iron-based clusters are found to be more active as compared to conventional nano-sized catalyst. Small clusters up to 2 nm (approximately <100 atoms) in size have different geometric and electronic structures from their corresponding bulk. With regard to their geometry, these clusters adopt special atomic arrangements to reduce their surface energy compared to bulk. In addition, their electronic structures are not continuous, as in bulk, but rather discretized. Owing to these characteristics, small clusters exhibit different physical and chemical properties and functionalities from the bulk.

Technical Advantages of the Invention

The present invention has the following advantages over the prior arts:
- None of the prior arts known relate to an additive composition for highly stable metal-based QCs (<1 nm, i.e., 0.1-5 nm) dispersed in a hydrocarbon compatible medium.
- The present invention discloses synthesis of an additive composition comprising ceria and iron-based QCs dispersed in a hydrocarbon medium. The process can also be performed for synthesis of quantum clusters of other transition metals like cobalt, copper, manganese, zinc, etc. in a hydrocarbon medium.
- The process is easily scalable in bulk for industrial use.
- Simple organic oxyacid can be used as a stabilizing agent.
- The additive composition has been used for increasing the flame temperature of the gaseous fuels.
- The additive composition finds application as combustion improvers for liquid fuels to increase the fuel economy and decrease harmful emission.

Objectives of the Invention

It is an objective of the present invention to provide an additive composition comprising metal-based QCs dispersed in a hydrocarbon medium as a combustion improver for gaseous and liquid fuels.

It is another objective of the present invention to provide the synthesis of the additive composition comprising metal-based QCs dispersed in a non-reacting hydrocarbon medium compatible to the fuel.

Yet another objective of the present invention is that the metal-based QCs have been synthesized in-situ and dispersed in a hydrocarbon medium.

ABBREVIATIONS

QCs: Quantum clusters
TWC: Three-way catalyst
DPF: Diesel particulate filters
$CeO_2$: Cerium (IV) oxide/Ceria
NOx: Nitric oxide
nm: Nanometer
XRD: X-ray powder diffraction
UV-vis: Ultraviolet-visible
FTIR: Fourier transform infrared spectroscopy
BSIV: Bharat Stage IV
BSVI: Bharat Stage VI
TEM: Transmission electron microscopy
FBC: Fuel borne catalysts
LPG: liquefied petroleum gas
LNG: Liquefied natural gas
CNG: Compressed natural gas
PNG: Piped natural gas
MTO: Mineral turpentine oil
IC: Internal combustion
MS: Motor spirit
CAN: Ceric ammonium nitrate
ppm: Parts per million
FT: Flame temperature

DETAILED DESCRIPTION OF THE INVENTION

Figure 1:
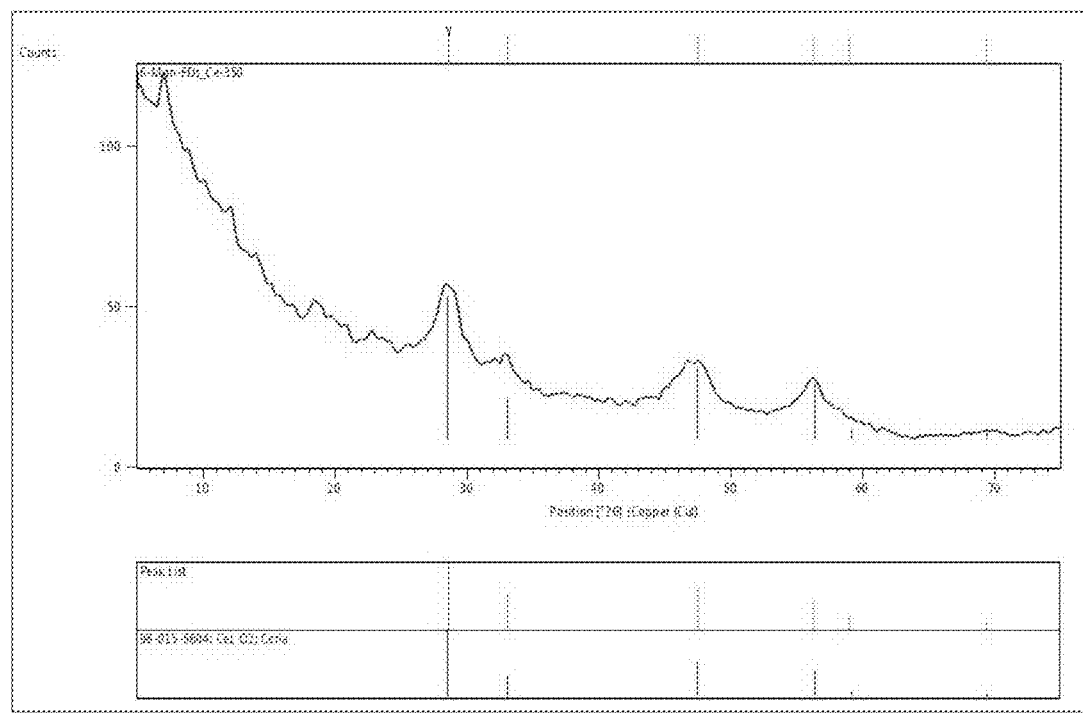
FIG. 1 discloses X-ray powder diffraction (XRD) diffraction pattern of synthesized ceria after heat treatment at 350° C.
Figure 2:
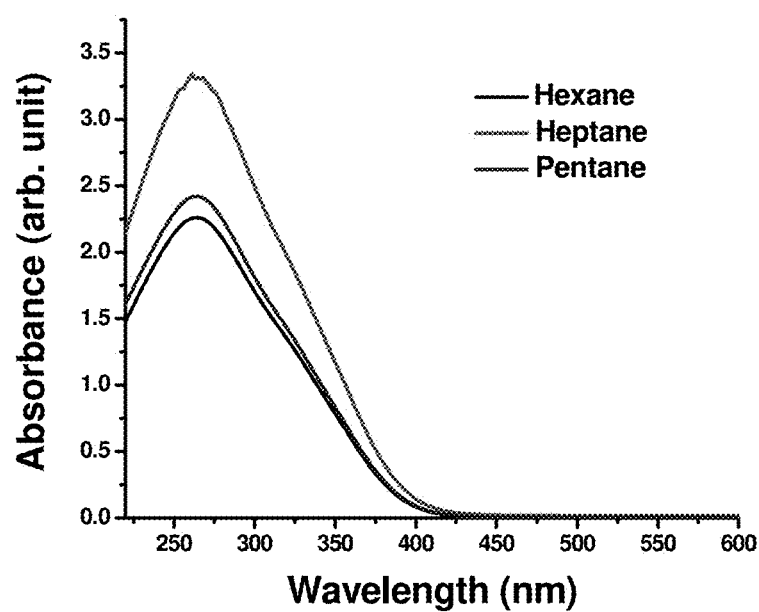
FIG. 2 discloses ultraviolet-visible (UV-vis) spectra of ceria-based quantum clusters (QC) synthesized in different solvent.
Figure 3:
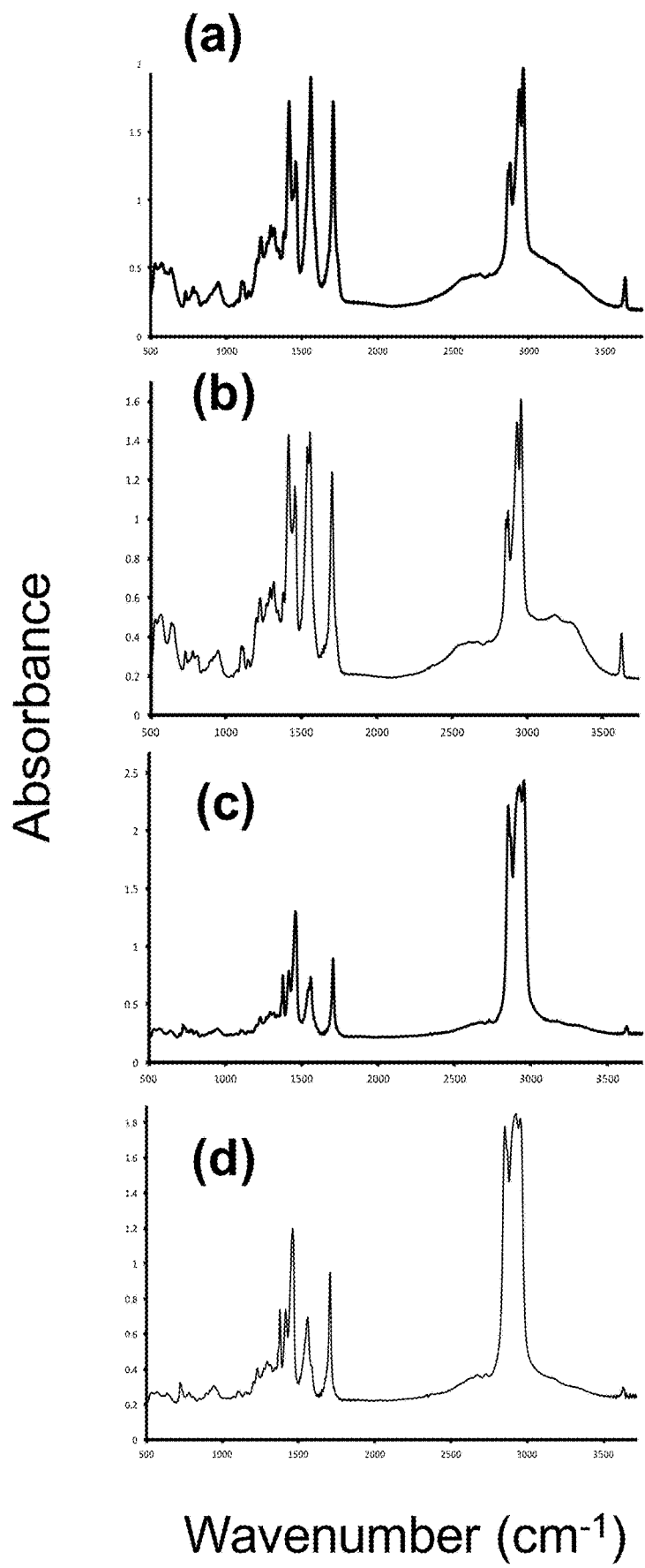
FIG. 3 discloses Fourier transform infrared spectroscopy (FTIR) spectra of Ceria quantum clusters (QC) synthesized in (a) Hexane; (b) Pentane; (c) Bharat Stage IV (BSIV) Diesel and (d) (Bharat Stage VI) BSVI Diesel FIG. 4 discloses particle size distribution of ceria-based quantum cluster in organic solvent.
Figure 4:
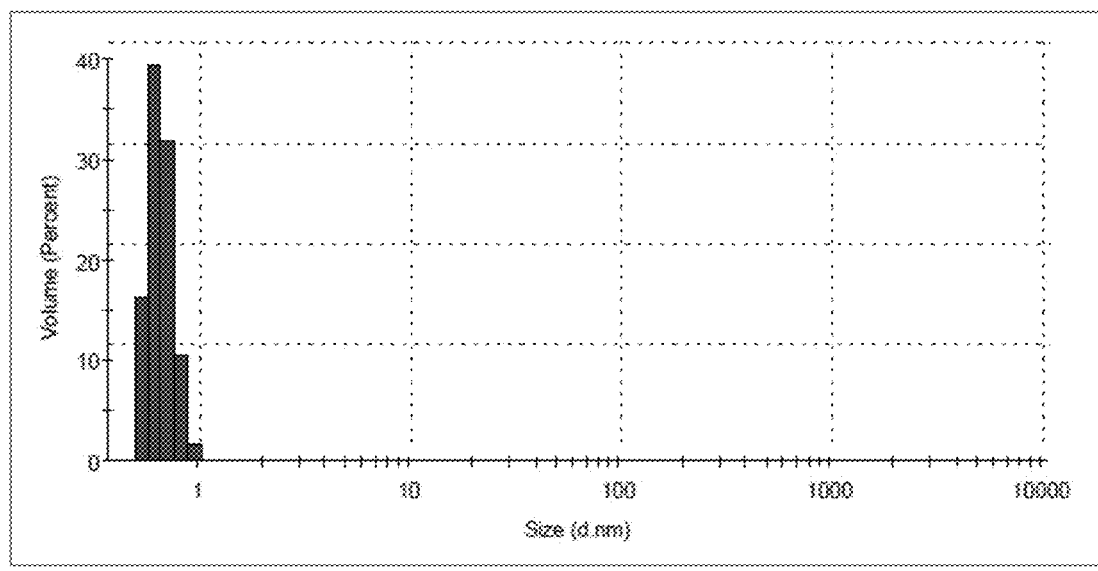
Figure 5:
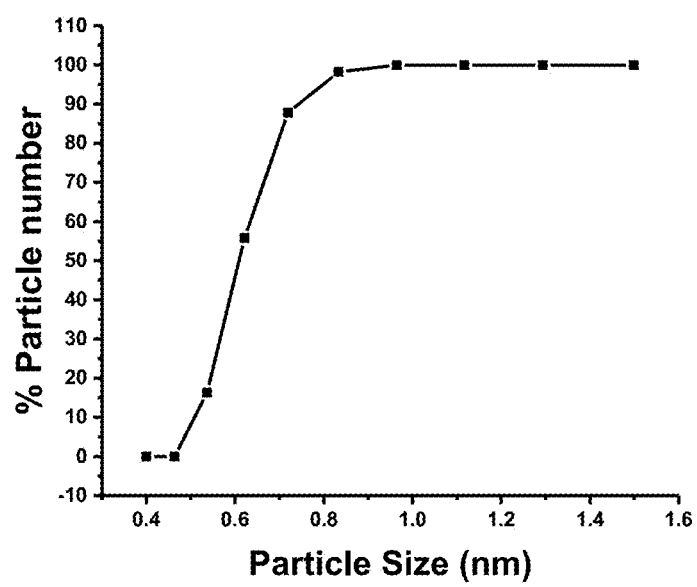
FIG. 5 discloses D50 and D90 plot of ceria-based quantum cluster in organic solvent.
Figure 6:
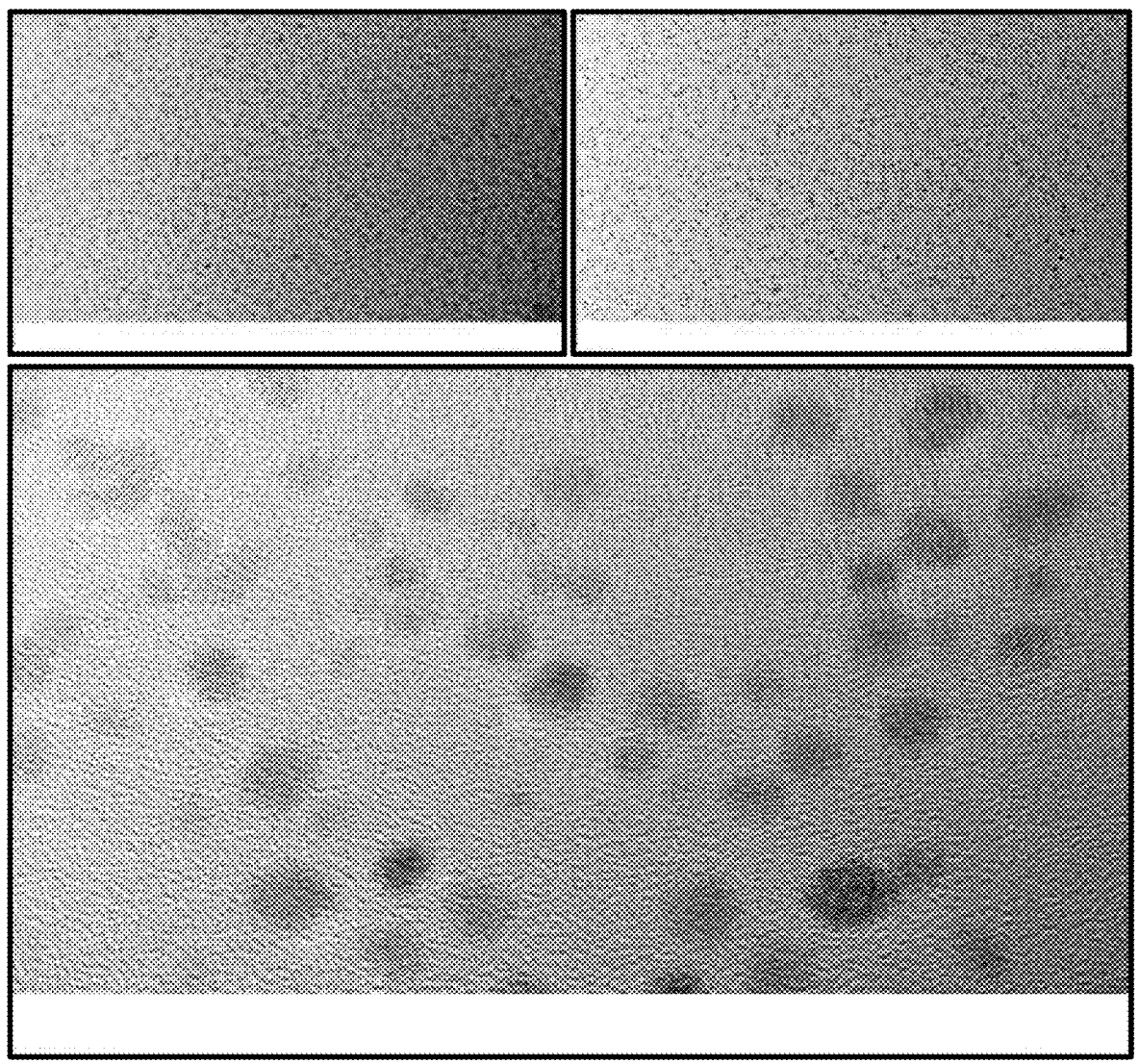
FIG. 6 discloses transmission electron microscopy (TEM) image of ceria quantum cluster FIG. 7 discloses particle size distribution of iron-based quantum cluster in organic solvent FIG. 8 discloses D50 and D90 plot of iron-based quantum cluster in organic solvent
Figure 7:
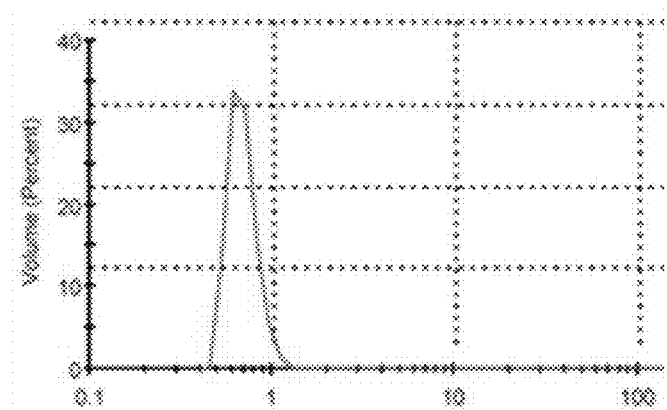
Figure 8:
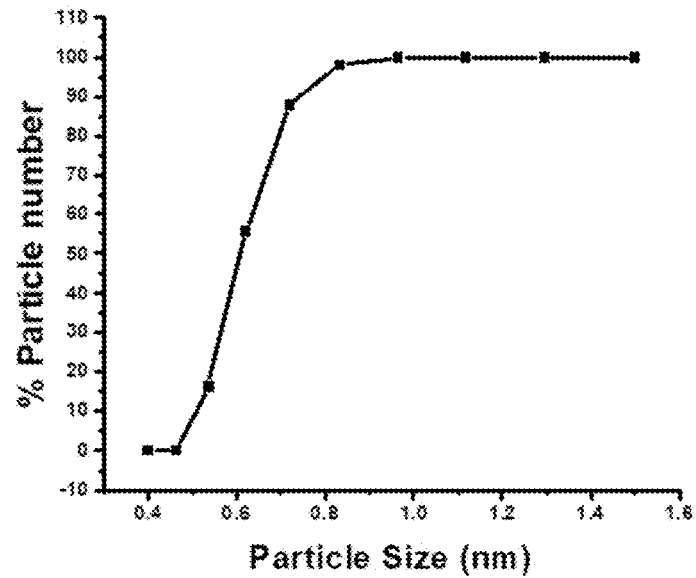

Those skilled in the art will be aware that the present disclosure is subject to variations and modifications other than those specifically described. It is to be understood that the present disclosure includes all such variations and modifications. The disclosure also includes all such steps of the process, features of the system, referred to or indicated in this specification, individually or collectively and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have their meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally equivalent products and processes are clearly within the scope of the disclosure, as described herein.

The present invention relates to an additive composition for improving fuel combustion. The additive composition comprises 1-8 wt. % of metal-based QCs dispersed in a 92-99 wt. % of a hydrocarbon medium. The metal-based QCs comprise a salt or a mixture of salts of an organic oxyacid; and a metal salt. The hydrocarbon medium is a non-reacting medium, and wherein the hydrocarbon medium comprises an oil phase. The hydrocarbon medium comprises pentane, isopentane, hexane, or heptane. The metal-based QCs are present in an atomic cluster form.

In yet another embodiment, at least five mole proportions of the salt or the mixture of salts of the organic oxyacid are required per mole of the metal salt.

In another embodiment, the metal salt comprises a nitrate salt, a sulfate salt, or a chloride salt of a metal selected from a group consisting of cerium, iron, nickel, cobalt, manganese, zinc, or copper. The metal salt is preferably water soluble. Preferably, it is ceric ammonium nitrate and iron chloride. The cerium (IV) and iron (III) salt may also react with the salt of the organic oxyacid in aqueous phase and simultaneously get stabilized in oil phase.

In yet another embodiment, the organic oxyacid is selected from a group consisting of carboxylic acid, organic sulfuric acid, sulfonic acid, phosphoric acid, or phosphonic acid. The salt of the organic oxyacid is preferably an alkali metal salt, such as a sodium or potassium salt, or an ammonium salt. The organic oxyacid acts as a dispersant and comprises acidity in the range of 1-5 pKa.

In another embodiment, the size of the metal-based QCs ranges from 0.1-5 nanometer (nm) without any agglomeration. Generally, particle size of the QCs will not exceed 5 nm, the size of the QC is especially below 2 nm.

According to another embodiment, the present invention relates to in-situ synthesis of metal-based QCs. These metal-based QCs are dispersed in a non-reacting hydrocarbon medium.

In another embodiment, the present invention discloses a process for synthesis of the additive composition comprising the metal-based quantum clusters (QCs) dispersed in the hydrocarbon medium as a combustion improver for fuels, the process comprising:

(a) preparing a salt or a mixture of salts of an organic oxyacid;

(b) adding a hydrocarbon medium to the salt or the mixture of salts of the organic oxyacid to form a reaction mixture, wherein the non-reacting hydrocarbon medium comprises an oil phase;

(c) heating the reaction mixture to a temperature range of 25-80° C., preferably to a range of 50-70° C.;

(d) adding a metal salt dissolved in water to the reaction mixture and continuing heating the reaction mixture for a period of 1-4 hours; and (e) recovering the product containing the oil phase and washing with water followed by filtration to obtain the additive composition.

In yet another embodiment, in step (a) the salt or the mixture of salts of the organic oxyacid is prepared in-situ by reacting the organic oxyacid with an oxide, hydroxide, hydrogen carbonate or carbonate of an alkali metal or an alkaline earth metal to form a mixture, to a pH in a range of 7 to 10, preferably about 8. The oil phase needs to be added in the reaction mixture after formation of the salt of organic oxyacid. Once the entire reaction mixture including oil phase reaches to the desired reaction mixture then only metal salt in water would be added. This chronology is very crucial to obtain metal-based QCs in oil phase.

In another embodiment, the present invention also describes doping the fuels with the additive composition to catalyze the combustion process, thereby increasing the flame temperature and heat through put. The additive composition can be used in fuels to improve overall fuel economy and emission. Especially, no such effort has been reported for increasing the efficiency of the flames by using metal-based QCs dispersed in a hydrocarbon medium. The enhancement of the heat output and flame temperature through catalytic combustion is not reported so far. The present invention describes the catalytic combustion of gaseous hydrocarbon fuels in open flame and increases its heat output as well as flame temperature. The same can be extended to liquid fuel combustion improver in IC engines also.

In yet another embodiment, the present invention discloses a synthetic method for the growth of catalyst which can be restricted in cluster level. These fuel borne catalysts (FBC) are basically metal oxo/hydroxo complexes stabilized by long-tail organic ligands. The inorganic content is in-situ transformed during the combustion process into the oxide and catalyze the process. The main advantage of the FBC is an effective dynamic intermingling of the nascent particles of the catalyst and soot in a gas phase which is beneficial for increasing of the number of their mutual contact points. As a result, the oxygen transfer from the catalyst toward the hydrocarbon fuel is facilitated, enhancing the combustion process.

In another embodiment, the present invention provides that the additive composition comprising the metal-based QCs are dispersed in a non-reacting hydrocarbon medium compatible to the fuel. A bottom-up synthesis method is employed for the preparation of the additive composition. These clusters are functionalized to prevent agglomeration. A dispersant for stabilizing the particles has been used compatible to the matrix and fuel composition. The dispersant used is a non-reacting hydrocarbon medium, which comprises an oil phase In another embodiment, the present invention discloses a process for synthesis of an additive composition comprising metal-based QCs dispersed in a hydrocarbon medium, as a combustion improver for fuels. The metal-based QCs comprise ceria-based QCs and iron-based QCs.

In a preferred embodiment, a process for synthesis of ceria-based QCs comprises—preparing a salt by reacting ethyl hexanoic acid with sodium hydroxide in water; followed by addition of an oil phase hydrocarbon medium and heating the solution to a temperature present in a range of 25-80° C.; adding 2.74 mole of ceric ammonium nitrate (CAN) salt dissolved in water to the reaction mixture to obtain the ceria-based QCs in a non-reacting hydrocarbon medium.

In a preferred embodiment, a process for synthesis of iron-based QCs comprises—preparing a salt by reacting ethyl hexanoic acid with sodium hydroxide in water; followed by addition of an oil phase hydrocarbon medium and heating the solution to a temperature present in a range of 25-80° C.; adding 2.74 mole of $FeCl_3.6H_2O$ salt dissolved in water to the reaction mixture to obtain the iron-based QCs in a non-reacting hydrocarbon medium.

In another embodiment, the liquid and gaseous fuels are doped with the additive composition to improve the combustion process. The additive composition may be present in form of suspension or dispersion in the liquid or gaseous fuels.

In yet another embodiment, the liquid and gaseous fuels are doped with the additive composition in a concentration range of 1-200 μm, preferably in a range of 10-100 ppm, more preferably in a range of 10-40 ppm of the fuel composition. The amount of additive composition may vary depending upon the nature and composition of the fuel. For LPG fuels, 2 ppm doping with the additive composition is enough to get satisfactory performance enhancement. For diesel fuel, the doping of the additive composition may be around 40 ppm. The additive composition is readily dispersible in fuels with or without co-surfactant depending on the nature of the fuel. The measurable flame temperature of the fuels, for instance commercial LPG on burner has been observed to increase at least by 60 to 80° C. The flame with high heat through put can be used for efficient cooking, heating, annealing and related high thermal applications.

In another embodiment, the gaseous fuel may be propane, butane, or a mixture thereof at different ratio (such as LPG). The fuel under subject may be liquefied natural gas (LNG) or compressed natural gas (CNG) at different composition. The liquid fuel may be diesel, gasoline, motor spirit, mineral turpentine oil (MTO) and others.

In another embodiment, the application of fuels doped with the additive composition include but are not limited to high temperature applications such as metal cutting, brazing, soldering, etc., where a high flame temperature is desirable. The additized fuel is also suitable for LPG/propane fired boilers, automotive applications, etc. The additized LPG will reduce cooking time, consumption of gas in cooking and enhance heating significantly.

In another embodiment, the additive composition containing liquid fuels may also be suitable for internal combustion (IC) engines based on diesel and motor spirit (MS).

EXAMPLES

Having described the basic aspects of the present invention, the following non-limiting examples illustrate specific embodiments thereof. Those skilled in the art will appreciate that many modifications may be made in the invention without changing the essence of the invention.

Example 1: Preparation of Additive Composition Comprising Cerium (IV)-Based QCs

The large-scale production of an additive composition comprising cerium (IV) based QCs was carried out as follows: 2.74 mole ceric ammonium nitrate (CAN) was dissolved in 1 liter water. 10.4 mole Ethyl hexanoic acid was mixed with 5-liter water followed by addition of 4-liter of 45M NaOH solution in water. Then addition of 10-liter oil was done and the solution was heated to a temperature range of 60° C. Finally, the CAN solution was added, and the reaction was continued for heating for a time of 2 hours. On completion of the reaction, the product containing oil layer was recovered and washed thoroughly with water and the additive composition was collected after filtration. The ceria concentration measured with ICP analysis was found to be 5 wt. % and particle size was measured around 1 nanometer (nm). The final concentration of Ce can be increased by changing the salt amount accordingly. The final concentration of quantum clusters in the additive composition varies depending upon oil used and source of metal salt.

UV-vis spectrophotometry of ceria is of particular interest as it provides quantitative information about the type of oxidation state and rate of reaction. It is known that Ce(III) absorbs both the UV and the Visible region while Ce(IV) absorbs the Visible region. Here cerium oxide exhibits strong absorption bands at 260 nm in the UV range in different solvents. Usually, $CeO_2$ absorbs around 300 to 340 nm range. Due to size reduction (below 2 nm) the UV-vis spectra have been shifted to blue region.

Infrared spectrum (FTIR) of the synthesized ceria-based additive composition to be in the range of 500-4000 $cm^{-1}$ wave number and identifies the chemical bonds, as well as functional groups in the compound. The sharp band at 3650 $cm^{-1}$ is ascribed to the O—H stretching vibration in OH⁻ groups or Ce—O—$H_2$. The broad peak in the range 3,400-2,400 $cm^{-1}$ indicates OH of free carboxylic acid. Very sharp peak at 1707 cm-1 represents the C═O of carboxylic acid. The strong sharp peak at 1580-1550 $cm^{-1}$ represents the C═O of carboxylate. The weak peaks in the range of 700-500 $cm^{-1}$ represent the complex framework of Ce—O clusters.

Another aspect of the present invention is to dope the hydrocarbon fuels with additive composition comprising ceria clusters and evaluate the efficiency. For this, liquefied propane and LPG have been used. The flame was generated and the temperature of inner core of the flame was measured by a thermocouple. The experimental flame temperature obtained was found to be at least 50° C. more than the gaseous fuel under study.

Example 2: Preparation of Additive Composition Comprising Iron (III)-Based QCs The large-scale production of an additive composition comprising Iron (III)-based QCs was carried out as follows: 2.74 mole $FeCl_3 \cdot 6H_2O$ was dissolved in 1-liter water. 10.4 mole Ethyl hexanoic acid was mixed with 5-liter water followed by addition of 4-liter of 45M NaOH solution in water. Then addition of 10-liter oil was done and the solution was heated to a desired temperature of 60° C. Finally, the iron chloride solution was added, and the reaction was continued for heating for a time of 2 hours. On completion of the reaction, the product containing oil layer was recovered and washed thoroughly with water and the additive composition was collected after filtration. The iron concentration measured with ICP analysis was found to be 2 wt. % and particle size was measured to be around 1 nm. The final concentration of quantum clusters in the additive composition can be increased by changing the salt amount accordingly.

Example 3: Doping of Gaseous Fuel with the Additive Composition

Additive composition comprising Ce and Fe-based QC are synthesized by dispersing in a hydrocarbon medium having a concentration of 5 and 2 wt. % respectively. For doping in LPG, the QCs were dispersed in hydrocarbon solvents like pentane, Isopentane, hexane, heptanes, etc. The additive composition can be directly doped in LPG without any co-surfactant as per required amount. LPG were doped with the additive composition in different concentrations ranging from 2-40 ppm.

Example 4: Flame Temperature Measurement

This method covers measurement of flame temperature of an open flame on LPG gas burner. The use of this method aims at ascertaining the presence of catalyst in differentiated LPG cylinder by measuring the enhancement in flame temperature (FT) on a domestic stove.

Equipment for the Test:
1. Domestic two burners stove (IS marked)
2. Type 'K' rigid thermocouple
3. Digital data logger
4. Clamp and stand for holding thermocouple
5. Gas lighter
6. LPG cylinder Procedure for the Test:
1. Connecting the thermocouple to the data logger and setting the thermocouple's type and channel position in the data logger before starting of measurement
2. Connecting the LPG cylinder to the domestic burner for the FT measurement purpose
3. Generating the flame in a suitable place to avoid drift/flow of wind that may disturb the flame sturdiness. The flame must be generated on Big Burner (rating: 189 gph) of domestic stove. The cleanliness of burner must be ensured before flame generation
5. Setting the thermocouple position horizontally at a height of 2 centimeter (cm) from outer edge of the burner nozzle (hole) of outer circle using clamp and stand
6. Switching on the flame of the burner at max position of knob and adjusting the thermocouple position at the outer edge of the blue flame very minutely to get highest temperature and recording the data when the temperature stabilizes within ±5° C. Please note that placing the thermocouple for longer time in the flame may damage it
7. Switching off the burner and switching off the data logger
8. Waiting for thermocouple and burner to cool down up to ambient temperature
9. Switching on the data logger first and repeating the step 1-6 to record the second reading for highest temperature measurement.

The procedure was adopted for LPG and additized LPG (LPG doped with additive composition comprising metal-based QCs in hydrocarbon medium). The flame temperature for different additized LPG and blank LPG has been given in table 1.

TABLE 1

Flame temperature observation for additized and blank LPG

| Sr. No. | Sample | Flame Temperature (° C.) |
|---|---|---|
| 1 | Blank LPG | 852-856 |
| 2 | 10 ppm (Ce-QC) additized LPG | 930-935 |
| 3 | 5 ppm (Ce-QC) additized LPG | 918-926 |
| 4 | 10 ppm (Fe-QC) additized LPG | 921-925 |
| 5 | 5 ppm (Fe-QC) additized LPG | 912-918 |

It was clearly observed that for QC additized LPG (LPG doped with additive composition comprising metal-based QCs in hydrocarbon medium), the flame temperatures were 60-80° C. higher than regular LPG (not additized). The flame temperatures are reported in a range as a little variation was observed in flame temperature during measurement because of manual handling of the thermocouple.

Example 5: Fuel Saving Experiment Using 10 ppm Additized LPG (Iron-Based QC and Ceria-Based QC)

A comparative LPG consumption study for regular LPG and additized LPG (LPG doped with additive composition comprising metal-based QCs in hydrocarbon medium) were also performed as per below mentioned test protocol.

Materials Required for Experiment Set Up:
1. One ISO approved LPG Gas Stove (two burners).
2. One thermocouple (preferably Type 'K') and data logger for measuring data continuously against time in covering temperature range from ambient to 300° C.
3. One overhead stirrer (PTFE).
4. Two Flat bottom Pans (Steel) with lid having two holes (one for stirrer and other for thermocouple). One bigger flat bottom pan with lid for big burner and one small flat bottom pan with lid for small burner. These pans should cover the flame of the burner completely for better heat transfer. Details of the Pan is described in table 2.

TABLE 2

Materials required for experiment set up

| Sr. No. | Details | Big Flat Bottom Pan with lid having two holes for Big Burner | Small Flat Bottom Pan with lid having two holes for Small Burner |
|---|---|---|---|
| 1 | Material of Pan and lid | Stainless Steel | Stainless Steel |
| 2 | Capacity of Pan, liters | 5.0 | 2.0 |
| 3 | Diameter, millimeter (mm | 215 | 130 |
| 4 | Height, mm | 120 | 90 |
| 5 | Heating medium (Mustard Oil), liters | 3.0 | 1 |
| 6 | RPM | 90 | 50 |

Experimental Process:
1) Taking a pan with lid. Taking recommended amount (3.0/1 L) of mustard oil in pre-weighed pan suitable for respective burners and noting the weight of the respective vessel.
2) Fixing LPG cylinder with stove and switching on the LPG cylinder regulator. Taking initial weight of LPG cylinder with regulator and tube as reference.
3) Putting the pan with oil on the burner first. Then fixing the stirrer and thermocouple through the holes in lid of the pan and marking the depth of both stirrer and thermocouple insertion in oil. After that switching on the stirrer (90/50 RPM) and data logger.
4) Switching on the stove knob and igniting the LPG simultaneously. The knob was fixed for the maximum position.
5) Heating the oil with constant stirring till the temperature reaches 200° C. and switching off the stove knob immediately after the temperature is reached.
6) Noting the final weight of LPG cylinder with regulator and tube (reference) immediately after the test without disturbing any set up.
7) Repeating above exercise three times with reference LPG and every time fresh mustard oil was taken. The LPG cylinder weight was taken before start of test and just after the test every time to avoid chances of minor leakages, if any.
8) After this, repeating the same exercise 3 times by replacing the LPG cylinder with QC-additized LPG cylinder and keeping other points same as with reference LPG.

Average reading of the three data points was taken for calculation of the difference in gas consumption. Fuel consumption data has been depicted in table 3.

TABLE 3

Calculation of difference in gas consumption

| Sr. No | Parameter | Additized LPG (Iron-based QC) | Additized LPG (Ceria-based QC) |
|---|---|---|---|
| 1 | LPG savings in small burner of domestic stove | −7.70 | −8.20 |
| 2 | LPG savings in big burner of domestic stove | −5.29 | −6.1 |

Overall, it was observed that by using iron-based QC-additized cylinders 7.7% and 5.29% fuel can be saved as compared to normal LPG in small and big burner respectively. Similarly in case of ceria-based QC-additized cylinders 8.2% and 6.1% fuel savings were observed in small and big burner respectively.

Example 6: Doping of Liquid Fuel with the Additive Composition

For doping of liquid fuels like diesel with an additive composition, an additional co-surfactant is required for long term stability. A nonionic co-surfactant sorbitan oleate (SPAN-80) was used in different mole ratio with respect to the additive composition to get them stabilized in diesel fuel. Details of the stability study done by ICP analysis for different mole ratio of Ce-based and Fe-based additive composition have been depicted in Tables 4 & 5.

TABLE 4

Stability observation for (Ce-based QC) additized BSVI diesel (Ce-based QC) Additized BSVI Diesel

| Molar Ratio Ce: SPAN80 | Result as ) prepared (ppm) | Result after 60 days (ppm) |
|---|---|---|
| 1:5 | 270 | 270 |
| 1:10 | 263 | 262 |
| 1:15 | 275 | 274 |
| 1:20 | 285 | 285 |
| 1:25 | 290 | 288 |

TABLE 5

Stability observation for (Fe-based QC) additized BSVI diesel (Fe-based QC) Additized BSVI Diesel

| Molar Ratio Fe: SPAN80 | Result as prepared (ppm) | Result after 60 days (ppm) |
|---|---|---|
| 1:5 | 142 | 140 |
| 1:10 | 143 | 142 |
| 1:15 | 147 | 144 |
| 1:20 | 153 | 150 |
| 1:25 | 155 | 152 |

Detail fuel specification after doping with the additive composition (Ce-based and Fe-based QCs) in diesel were performed and found compliance with BSIV and BSVI norms (depicted in Tables 6 & 7).

TABLE 6

No harm test with 40 parts per million (ppm) (Ce-based QC) additized BSIV and BSVI diesel

| | | | Sample Details CD/FRD | |
|---|---|---|---|---|
| S. No. | Properties | Test Methods | CQC BSIV-DIESEL (F-09-04) | CQC BSVI-DIESEL (F-09-05) |
| | | | Unit of measurement | Test Results |
| 1 | Appearance | — | — | Clear, bright, free from sediments | Clear, bright, free from sediments |
| 2 | Density at 15° C. | ASTM D4052 | Kg/m$^3$ | 827.3 | 819.5 |
| 3 | Distillation: 95% volume/volume recovery, Max | ASTM D86 | Deg C | 363 | 355.7 |
| 4 | Flash point, Abel, Min | IS: 1448 (P: 20) | ° C. | 47.0 | 53.0 |

TABLE 6-continued

No harm test with 40 parts per million (ppm) (Ce-based QC) additized BSIV and BSVI diesel

| S. No. | Properties | Test Methods | Unit of measurement | Sample Details CD/FRD CQC BSIV-DIESEL (F-09-04) Test Results | CQC BSVI-DIESEL (F-09-05) Test Results |
|---|---|---|---|---|---|
| 5 | Total sulphur, Max | ASTM D5453 | PPm | 30 | 2 |
| 6 | K. V. at 40° C. | ASTM D445 | cSt | 2.635 | 2.767 |
| 7 | Cu strip corrosion 50 | IS: 1448 (P: | — | No. 1 | No. 1 |
| 8 | Cetane Index, Min | ASTM D4737 | — | 55.7 | 61.0 |
| 9 | Cold filter plugging point, Max Winter Summer | ASTM D6371 | ° C. ° C. | 0 | −1.0 |
| 10 | Water content, Max | ISO 12937 | mg/kg | 120 | 50 |
| 11 | Lubricity, corrected WSD @ 60° C., Max | ISO 12156 | μm | 414 | 406 |
| 12 | Total Contamination, Max | DIN 51419 | mg/kg | 6 | 4 |
| 13 | Acidity, Inorganic | IS 1448, P:2 | Nil | Nil | Nil |
| 14 | Acidity, total, mg of KOH/g, Max | ASTMD 974 | To report | 0.04 | 0.03 |
| 15 | Carbon residue (Ramsbottom) on 10% residue, % mass, Max | IS 1448, P:8 | 0.30 | <0.1 | <0.1 |
| 16 | Ash, % mass, Max | IS 1448, P:4 | % By mass | <0.001 | <0.001 |
| 17 | PAH | ASTM D6591 | % By mass | 1.3 | <0.2 |
| 18. | Cetane number, Min. | ASTM D613 | — | — | — |
| 19 | FAME Content Max | ASTMD 7371 | % v/v | 0.0 | 0.0 |
| 20 | Pour Point Max Winter Summer | — | ° C. ° C. | −6.0 | −6.0 |
| 21 | Oxidation stability | ASTM D7545 | Minutes | 51 | 57 |

TABLE 7

No harm test with 40 ppm (Fe-based QC) additized BSVI diesel

| S. No. | Characteristics | Test Methods | Units of measurement | Sample Details CD/Location/FRD BSVI HSD F-08-03 Test Results | QC-40/BSVI F-08-04 Test Results |
|---|---|---|---|---|---|
| 1 | Density@ 15° C. | ASTMD 4052 | Kg/m³ | 819.2 | 821.0 |
| 2 | Flash point, Abel, Min | IS 1448 (P:20) | ° C. | 46.5 | 46.0 |
| 3 | Calorific Value | ASTMD 240 | Cal/gm | 11041 | 11014 |
| 4 | K.V. at 40° C. | ASTMD 445 | cSt | 2.755 | 2.844 |
| 5 | Pour Point | ASTMD 97 | ° C. | −3.0 | −3.0 |
| 6 | Water Content Max | ISO 12937 | Mg/kg | 60 | 6.4 |
| 7 | Total Sulphur, Max | ASTMD D2622 | ppm | 4 | 4 |

We claim:

1. An additive composition comprising:
 (a) 1-8 wt. % of metal-based quantum clusters (QCs) comprising:
  (i) an organic oxyacid salt or a mixture of salts of an organic oxyacid; and
  (ii) a metal salt,
  wherein at least five mole proportions of the salt or the mixture of salts of the organic oxyacid are required per mole of the metal salt; and
 (b) 92-99 wt. % of a hydrocarbon medium,
  wherein the metal-based quantum clusters (QCs) are dispersed in the hydrocarbon medium, wherein the additive composition is effective for improving combustion of a fuel.

2. The additive composition as claimed in claim 1, wherein the organic oxyacid is selected from a group consisting of carboxylic acid, organic sulfuric acid, sulfonic acid, phosphoric acid, or phosphonic acid.

3. The additive composition as claimed in claim 2, wherein acidity of the organic oxyacid ranges from 1-5 pKa.

4. The additive composition as claimed in claim 1, wherein the metal salt comprises a nitrate salt, a chloride salt, or a sulfate salt of a metal, and the metal is selected from the group consisting of cerium, iron, nickel, cobalt, manganese, zinc, and copper.

5. The additive composition as claimed in claim 1, wherein the hydrocarbon medium is a non-reacting medium, and wherein the hydrocarbon medium comprises an oil phase.

6. The additive composition as claimed in claim 5, wherein the hydrocarbon medium comprises pentane, isopentane, hexane, or heptane.

7. The additive composition as claimed in claim 1, wherein a size of the metal-based quantum clusters (QCs) ranges from 0.1-5 nanometer (nm).

8. The additive composition A fuel composition comprising the additive composition as claimed in claim 1, wherein the fuel comprises liquid and gaseous fuels.

9. The fuel composition as claimed in claim 8, wherein the fuel is doped with the additive composition in a concentration of 1-200 ppm of the fuel composition.

10. The fuel composition as claimed in claim 9, wherein the additive composition is present in the fuel in a form of dispersion or suspension.

11. A process for synthesis of the additive composition as claimed in claim 1, the process comprising:
   (a) preparing the salt or the mixture of salts of the organic oxyacid;
   (b) adding the hydrocarbon medium to the salt or the mixture of salts of the organic oxyacid to form a reaction mixture, wherein the hydrocarbon medium comprises an oil phase;
   (c) heating the reaction mixture to a temperature range of 25-80° C.;
   (d) adding the metal salt dissolved in water to the reaction mixture and continuing heating the reaction mixture for a period of 1-4 hours; and
   (e) recovering a product containing the oil phase and washing with water followed by filtration to obtain the additive composition.

12. The process as claimed in claim 11, wherein in step (a) the salt or the mixture of salts of the organic oxyacid is prepared in-situ by reacting the organic oxyacid with an oxide, hydroxide, hydrogen carbonate or carbonate of an alkali metal or an alkaline earth metal.

13. The additive composition as claimed in claim 1, wherein the quantum clusters (QCs) are free of any agglomeration.

* * * * *